Dec. 15, 1953
W. C. SIMPSON ET AL
2,662,845
THERMAL TREATMENT AND SEPARATION PROCESS
Filed Aug. 18, 1951
3 Sheets-Sheet 1
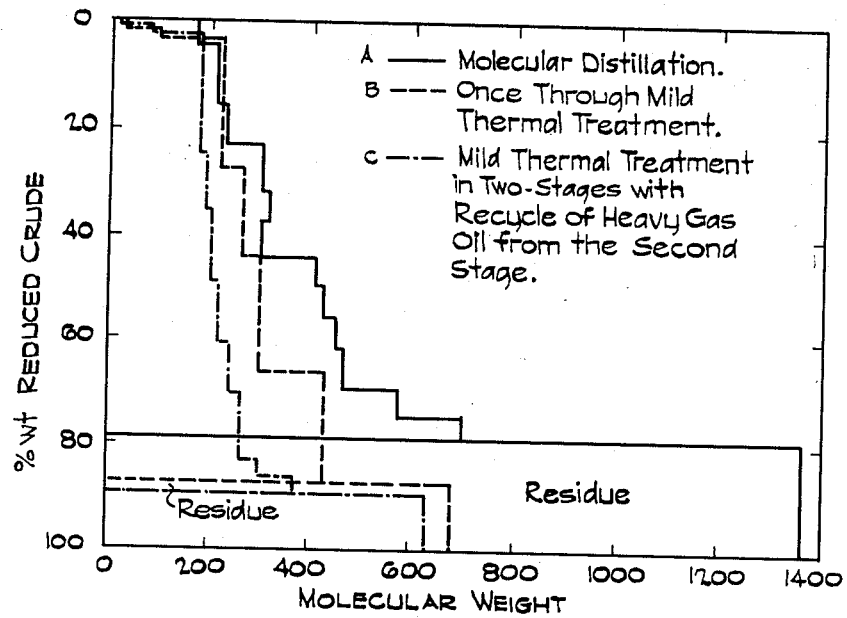
Fig. I
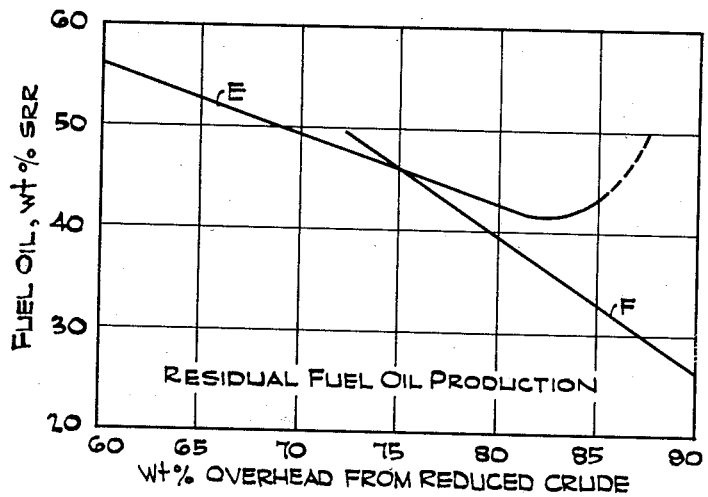
LEGEND:
E ONE STAGE, ONE STAGE WITH RECYCLE, TWO STAGES.
F TWO STAGES WITH RECYCLE.
Fig. IV
Inventors:
Warren C. Simpson
William B. Wilson
By John H. Colvin
Their Agent Dec. 15, 1953  W. C. SIMPSON ET AL  2,662,845
THERMAL TREATMENT AND SEPARATION PROCESS
Filed Aug. 18, 1951  3 Sheets-Sheet 2
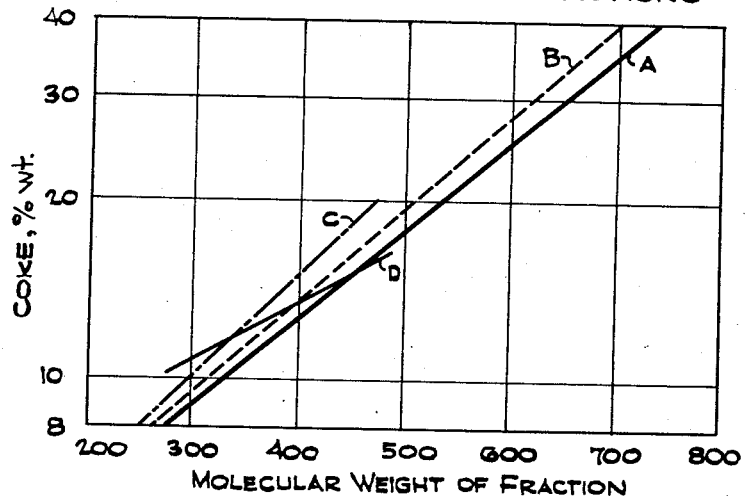
FIG. II
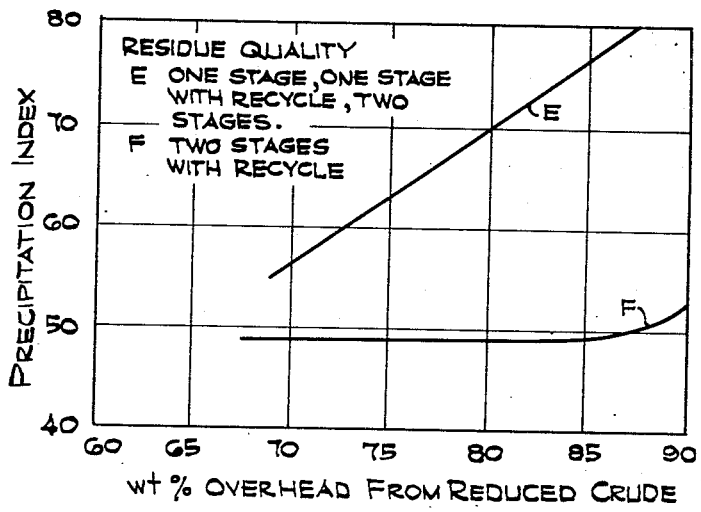
FIG. III
LEGEND:
A —— MOLECULAR DISTILLATION.
B --- ONCE THROUGH MILD THERMAL TREATMENT.
C —·— TWO STAGE MILD THERMAL TREATMENT WITH RECYCLE.
D —— TOTAL OIL DISTILLATES.
Inventors:
Warren C. Simpson
William B. Wilson
By John H. Colvin
Their Agent Dec. 15, 1953                W. C. SIMPSON ET AL                2,662,845
                     THERMAL TREATMENT AND SEPARATION PROCESS
Filed Aug. 18, 1951                                          3 Sheets-Sheet 3
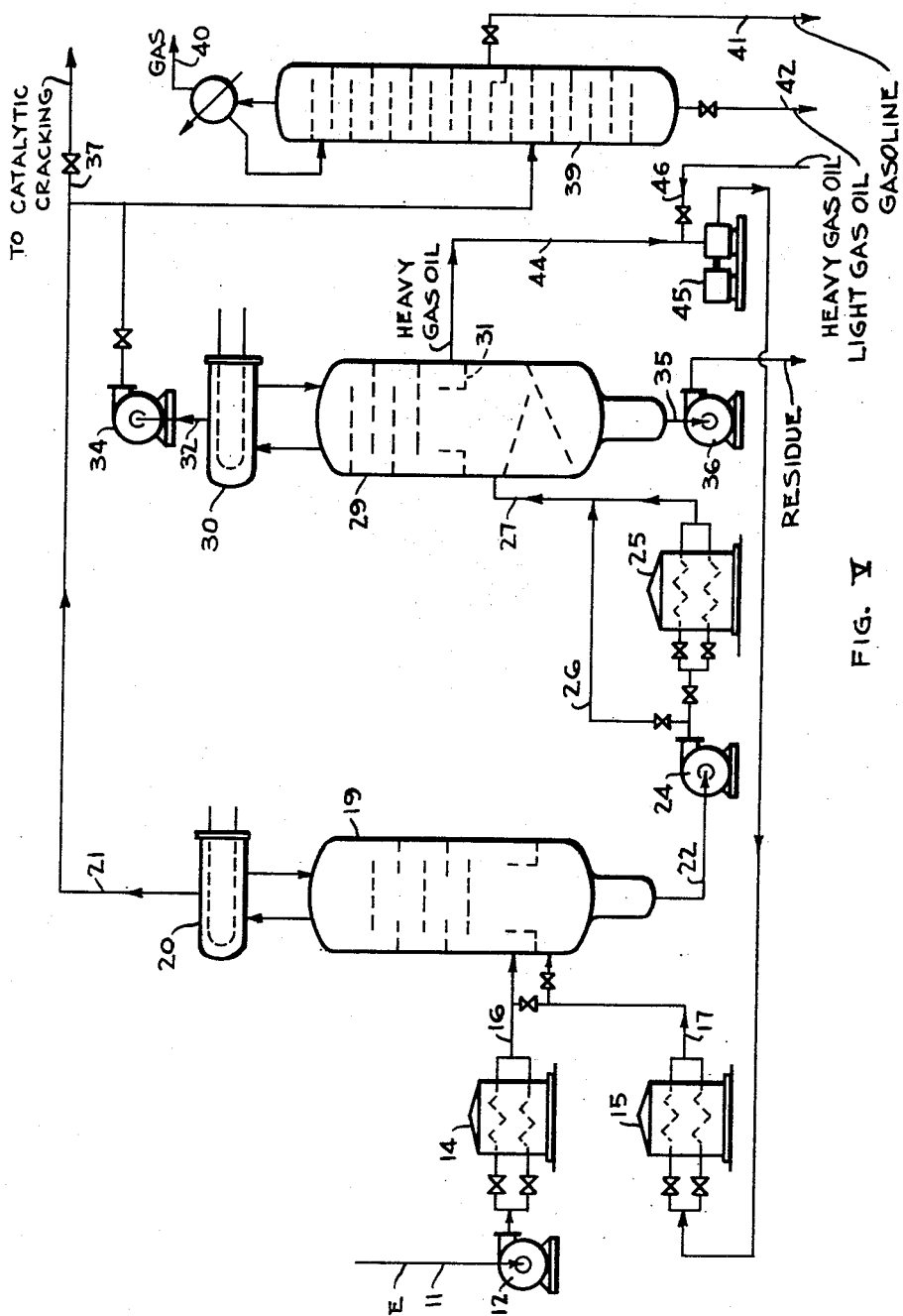
FIG. V
Inventors:
Warren C. Simpson
William B. Wilson
By: John H Colvin
    Their Agent Patented Dec. 15, 1953

2,662,845

UNITED STATES PATENT OFFICE 2,662,845

THERMAL TREATMENT AND SEPARATION PROCESS

Warren C. Simpson, Albany, and William B. Wilson, Concord, Calif., assignors to Shell Development Company, Emeryville, Calif., a corporation of Delaware Application August 18, 1951, Serial No. 242,522

7 Claims. (Cl. 196—50)

This invention relates to an improved process for the thermal treatment of hydrocarbon oils, and pertains more particularly to a process adapted for the production of distillates, the larger proportions preferably being of the character of kerosene and gas oils, from heavy oil, such as crude petroleum, partially reduced crude oil or the like.

Various methods have been proposed and utilized for the recovery of various distillate materials, such as gasoline, kerosene, light gas oil, heavy gas oil and lubricating oil distillates, from petroleum oils, both for their direct use and for use as feed stocks to various conversion processes. Thus, the gas oil distillates, both light and heavy, constitute an important feed stock for both thermal and catalytic conversions in the production of gasoline therefrom. So-called topped crudes or short residues, as well as certain heavy crudes oftentimes are subjected to a thermal treatment known as "visbreaking" to effect a viscosity reduction, followed by separation of vaporizable components, both natural and formed in the visbreaking, as one or more distillate fractions. The still heavier residual material resulting therefrom may be used in fuel oil blends or may be heated still more, if required, and then separated as in a flash-vessel to produce a further quantity of distillate—vacuum distillate.

Since the distillates boiling higher than gasoline are converted by catalytic cracking to gasoline of higher octane number than by thermal cracking, it is a general practice, where catalytic cracking capacity is available, to attempt to produce from the heavier petroleum oil materials a maximum proportion of distillate product to be utilized as catalytic cracking feed stock. In the case of mixed-base or asphaltic base crudes, this is generally done by a topping operation followed by the well-known vacuum flashing operation. Another practice is to heat and distill from the heavier oils and residual oils as much vaporizable material as possible while converting the ultimate residue to coke. However, the coke thus produced is generally of poor quality and of little market value. Still another practice is to subject the heavier oils to a deasphalting operation. The deasphalting process is effective only with certain types of crude stocks, and the cost is high.

In all such cases, the primary objective is to obtain from the crude oil, and particularly from the topped or reduced crude, a maximum amount of distillate oil with an optimum distribution of products or fractions thereof and an optimum residue product of suitable quality (utility) all consistent with the most economical and profitable operations of a particular refinery. In general, this means that it is highly desirable to secure from a given heavy petroleum oil the maximum amount of distillate material of the general character of kerosene and gas oil distillates while at the same time producing an amount of a residue of suitable quality which is blendable to a minimum amount of suitable fuel oil.

It is therefore a principal object of the present invention to provide an improved process for the production from a heavy hydrocarbon oil of a maximum amount of distillate oil having a composition distribution which is optimum in a feed stock for catalytic cracking operations in the production of motor fuels.

Another object of the invention is to provide an improved process for the thermal conversion of heavy petroleum stocks, such as reduced crude, to increase the yield of distillate oils therefrom.

A further object is to provide a process for the thermal conversion of heavy components of petroleum oils containing thermally unstable and cokable components into distillate oils of high catalytic cracking quality while avoiding the formation of coke, hence producing a residue product which is blendable to a suitable fuel oil.

A still further object is to obtain a maximum of oil distillate from a heavy petroleum oil, such as long or short residues, while producing a residue which is blendable to a minimum quantity of fuel oil.

The foregoing objects will be better understood and others will become apparent from the description of the invention which will be made with reference to the accompanying drawing wherein:

Fig. I is a graphical representation of the molecular weight distribution of a product obtained from a representative reduced crude before and after a mild thermal treatment and after a thermal treatment according to the present invention;

Fig. II shows graphically the coking characteristics of total oil distillates obtained by different processes as related to the average molecular weight of said distillate and also of fractions of said distillates;

Fig. III shows graphically the quality of the residues resulting from various treatments of a reduced crude to yield different proportions of overhead material;

Fig. IV shows graphically the minimum fuel oil production from the residues of Fig. III when each of the residues is blended with a given blending or cutter stock; and Fig. V is a diagrammatic flow sheet indicating a preferred method of practicing the invention wherein a reduced crude or long residue or so-called straight run residue (SRR) is subjected to a thermal treatment and separation operation to recover therefrom a maximum amount of gas oil distillate of superior catalytic cracking quality and a residue which is blendable to a minimum amount of suitable fuel oil, in accordance with the present invention.

It has now been found that heavy oil stocks, such as partially reduced crude (long residue), vacuum reduced crude (short residue), a heavy crude hydrocarbonaceous oil, or other heavy oil, are effectively converted primarily into distillate oils with little conversion to light products, such as gas and light condensible hydrocarbons, and without production of undesirable products of a residual character, by subjecting the heavy oil stock to mild thermal conversion conditions of temperature, time and pressure while simultaneously subjecting a heavy oil distillate stream (separated in the process) to thermal conversion conditions of greater severity, to convert a substantial portion of the heavy oil components to light oil components, admixing the two treated streams and subjecting the admixture to a first separation whereby the light oil components and lighter material are separated as overhead from a residual product which contains heavy oil distillable components of the heavy oil stock in addition to cokable residue components, and subsequently subjecting this heated residual product to a separation operation under reduced pressure (vacuum) to separate distillable components from residue components, and recycling heavy oil components of the resulting vacuum distillate to the process as described hereinbefore: the final vacuum residue is readily blendable with suitable blending stock to a coke-free fuel oil.

In accordance with a preferred manner of practicing the invention, the residual product obtained from the first stage separation operation, is separately heated to provide distillable components thereof with a further proportion of the required heat of vaporization for the subsequent fractionation operation, but the heating being limited to conditions which avoid the subjecting of the cokable components to coke-formation.

The first mild thermal conversion treatment to which the heavy oil stock is subjected is conducted under such conditions of temperature, residence time and pressure that only a partial conversion of the heavier components thereof into the gas oil boiling range is effected. This treatment is carried out under conditions to avoid condensation or polymerization reactions leading to coke formation from the residual portions or fragments (high molecular weight aromatic nuclei) of the heavier constituents of the heavy oil stock, which portions or fragments are still too large to be rendered volatile in the conversion zone.

It will be readily understood that the exact set of conditions which are optimum depends on a number of factors, such as the nature of the heavy oil stock (long residue, short residue, and the like) and other correlative conditions in the combination of operations. In general, the temperature suitably ranges from about 370° to about 425° C., the residence time from about 1 to 3 minutes, and the pressure from substantially atmospheric to a substantially superatmospheric pressure, which can be as high as 300 p. s. i. g. or even higher, although a pressure of from about 1 atmosphere to about 75 p. s. i. g. is preferable. It will also be understood that the higher temperatures are used at the shorter residence times, and vice versa.

The more severe thermal treatment of the recycle heavy gas oil stream accomplishes the conversion of this more refractory heavy oil distillate, in the substantial absence of readily cokable residue components, to more desirable light gas oil components with a minimum conversion to gas and gasoline. The conditions of temperature, time and pressure in this treatment are selected to bring about a substantial conversion of the heavy gas oil components into gas oil components of the desired lower boiling range and lower molecular weight range and having improved catalytic cracking quality, as will be discussed in more detail hereinafter, with particular reference to Fig. II. The conditions are suitably from about 450° to about 550° C., at a pressure of about atmospheric to about 300 p. s. i. g., preferably 50–200 p. s. i. g., with a relatively short residence time of 1 to 3 minutes.

The first separation operation is carried out under fractionating conditions selected to separate as overhead product therefrom light gas oil components and lighter substances, including gas and gasoline. The mildly thermally treated heavy oil stock and the more severely treated heavy gas oil distillate are intimately admixed either just before admission to the fractionator or immediately after such admission under conditions such that the hotter gas oil stream effectively raises the temperature of the heated heavy oil stock whereby the components thereof are at least momentarily subjected to a more severe thermal treatment, but in the presence of additional liquid heavy oil components provided by the heated heavy gas oil distillate, which additional liquid components effectively dilute cokable components of the heavy oil stock to prevent coke formation therefrom at the higher temperature, while at the same time the higher temperature results in effective thermal conversion of a further portion of the heavy components of the heavy oil stock.

The first-stage separation is generally carried out so as to remove as overhead product material having a molecular weight up to about 450, preferably about 375 or lower, representing from about 50% to about 65%, based on reduced crude. For this purpose, the separation is effected under at least mild refluxing conditions, with the temperature of the overhead being maintained at a value up to about 375° C.: it can be maintained at a value from about 275° C. up to about 375° C., for a separation at approximately atmospheric pressure. For a separation at slightly elevated pressures, for example at about 10 p. s. i. g. to about 30 p. s. i. g., the corresponding temperatures are slightly higher. Light gas oil components remaining in the residual product from the first separation zone are readily recoverable in the second separation operation.

The bottoms product from the first stage separation, now at a temperature substantially below cracking conditions, preferably is heated separately to supply the maximum amount of additional heat thereto without reaching cracking conditions. However, the process can be practiced without the additional heating at this stage. The thus-heated heavy residual oil is then subjected to a second separation, this time under conditions selected to remove essentially all distillable components as overhead from a remaining blendable residue. In view of the restriction on the temperature to which the heavy residual oil can be heated without cracking, this second fractionation is effected under a substantially subatmospheric pressure, such as from about 10 mm. to 200 mm. Hg pressure, preferably at an absolute pressure of from about 20 mm. to about 100 mm. of Hg pressure, in order to separate the distillable oil from the residue components.

All of or only a higher boiling fraction of the distillable material separated in the second separation operation is recycled for thermal conversion and utility in the process as already described. In general it is preferable to operate the combination process so that from about 75% to 100% of the gas oil separated in the second stage is recycled to the first stage of the process, with the remainder being lighter components which are suitably combined with the gas oil from the first-stage overhead product.

The process of the present invention is based on several facts which have been established by experimental studies. Such studies have shown that operations on reduced crude in regions of temperature and contact time which produce mild thermal cracking can be practiced in such a manner as to yield sizable increases in distillate products and at the same time to produce such distillate products having improved catalytic cracking characteristics and also maintaining residue quality for the production of stable, homogeneous residual fuel oil. The general applicability of the process of the invention to stocks representing various geographical locations and geological formations and of different initial crude quality has been indicated by investigations on long and short residues ranging in gravity from 22 to 7.7° API, and represented by mixed Los Angeles Basin crudes, Mid-Continent and Texas stocks, and Kuwait reduced crude.

Referring to Fig. I, the upper line (A) shows the constitution, on a molecular weight basis, of a 17.4° API reduced mixed Los Angeles Basin crude; this line shows the distribution of components by molecular weights as determined by a molecular distillation without any thermal conversion. It is to be seen therefrom that this reduced crude contains about 55% of material of 500 molecular weight or lower. By a mild and controlled once-through thermal treatment and separation process products are obtained from the same reduced crude such that the molecular weight distribution of the total composite thereof is representable by the intermediate line (B). Thus, distillate products of 500 molecular weight or lower are obtained to the extent of as much as 80–85% of the reduced crude: about 65% of the material has a molecular weight of about 400 or lower. However, by a two-stage process with recycle as practiced by the present invention, products are obtained from the same reduced crude as represented by the lowermost line (C). It is to be seen that a total of 88–90% of the reduced crude is recoverable as distillate material having a molecular weight as low as about 450 or lower and that essentially the same amount of distillable material is recoverable in this case having a molecular weight of about 400 or lower as the total recoverable distillate material in the case of the once-through mild thermal treatment. Furthermore, the smaller amount of residue is readily blendable to a suitable residual fuel oil. In fact it is more readily blendable, and blendable to a smaller amount of specification fuel oil, than the residue from the mild thermal treatment (see Figs. III and IV).

A further understanding of the factors and advantageous features of the process of this invention will be obtained from a consideration of the relationships which are shown graphically in Fig. II. Referring thereto, line A shows the relationship between the catalytic cracking quality, as measured by coking tendency, of different molecular weight distillate fractions as indicated by line A of Fig. I. The intersection of lines A and D represents the composite distillate recovered by molecular distillation. Thus, the coke value of the highest molecular weight fraction is about 50 and of the total distillate is about 14. Line B shows a corresponding relationship for the distillate material recovered from the once-through mild thermal treatment. Similarly, line C shows that in the case of a two-stage with recycle process in accordance with the present invention, the coke value of the highest molecular weight fraction of the distillate material is only about 20 (less than half of the values for A and B), and that the coke value of the total composite distillable material has been reduced to about 11. Thus, it is to be seen that although for a given molecular weight fraction the coke value is higher for the fraction which has been recovered from the material which has been subjected to the greater thermal conversion, the coke value of the highest molecular weight material is substantially lower as well as the coke value of the total distillate: the net result is a considerable improvement in the value of the composite distillate as catalytic cracking feed stock. However, the factors which contribute to this improvement in distillate quality must eventually reach a state at which there is an optimum improvement and therebeyond the benefit of further lowering of molecular weight begins to be outweighed by the other factors. Coke values for the total liquid overhead for a given operation are indicated by line D.

In addition to yielding larger amounts of overhead distillate material having improved properties for catalytic cracking, the process of the present invention at the same time yields a residue which is more readily blendable to a suitable fuel oil, as shown in Fig. III. Referring to Fig. III, the uppermost line (E) shows the relationship between the percent of the reduced crude which is removed as overhead product, in various processes, and the quality of the recovered residue, as measured by the precipitation index thereof. Line E represents this relationship for different types of processes, including a once-through mild thermal treatment, a one-stage process with recycle of separated heavy gas oil, and a two-stage thermal treatment process. The lower curve (F) shows the corresponding relationship for the residue obtained when the reduced crude is subjected to the two-stage with recycle process of the present invention. The precipitation index is the percentage of alpha-methylnaphthalene in a mixture thereof with cetane which will just dissolve the least soluble component of the residue: the higher the precipitation index the less readily blendable is the residue. The results represented by line E show that residues produced by the three indicated processes are of about the same quality, beginning with a precipitation index of about 55 for an overhead of about 70% (residue about 30%) and increasing linearly to a precipitation index of about 80 at an overhead yield of about 88%. On the other hand, the precipitation index of the residue recovered by the present process remains fairly constant at a value of about 45–50 up to an overhead recovery of as much as about 87% (13% residue) and increases only to about 53 when 90% of the material is recovered as overhead product (10% residue). The precipitation index of the untreated reduced crude was about 45.

The residues from two-stage operation with recycle in accordance with the present invention have very low precipitation index values, even when 90% by weight of the reduced crude is taken overhead. The conditions prevailing in the various stages of the process where residue components are subjected to thermal treatment, and particularly in the last stage treatment and separation operation appear to contribute to the residue quality. The efficacy of the process of this invention is demonstrated by comparison with results of a series of experiments in which the thermal hazard, of the operation in which residue and heavy gas oil are separated, was completely eliminated by the use of solvent extraction with isopentane at a solvent to oil ratio of 8 to 1, for recovery of the heavy recycle oil from the residue. The residues remaining had low precipitation index values (about 45–48) and gave low fuel oil yields, very nearly the same as obtained when the continuous vacuum flash was used to obtain the separation. Blending of the residues from the solvent extraction with an ordinary cutter stock (primarily catalytic cracked gas oil) or with a much more aromatic cutter stock (furfural extract of catalytic cracked gas oil) showed no difference in fuel oil yield. The more aromatic cutter stocks are useful only when the residue has a high precipitation index of about 70 or above; in that case much more aromatic cutter stocks are required.

Fig. IV shows the minimum residual fuel oil production from the residues referred to in Fig. III. Line E refers to the same processes in both figures; line F in each figure refers to practice in accordance with the present invention. Fuel oil yields from all types of operation except two-stage operation with recycle fall on a single line. These fuels pass into a region of viscosity instability, poor microscopic appearance and high B. S. and W. (bottoms, sediment and water) at overhead yields in excess of about 82% by weight of the reduced crude. The yield of fuel oil also rises abruptly for higher overhead yields in this region. The fuel oils from two-stage operation with recycle show good viscosity stability, good microscopic appearance and low B. S. and W. (0.1%) at 90% overhead from the reduced crude. The yield drops to as low as 25% by weight of the reduced crude at 90% by weight reduced crude overhead.

It is to be seen that particular advantages of the process of this invention are the suppression of condensation reactions which lead eventually to coke formation, while at the same time effecting the desired thermal conversion of the heavier oil components to lighter gas oil components. In addition to increasing the yield of gas oil distillate recoverable from the heavy oil stock over the yield obtainable by other processes, the total gas oil recovered is of improved quality as a catalytic cracking feed stock for the production of motor fuels. At the same time that the yield and the quality of the gas oil are enhanced, the residue product is decreased substantially in amount from the amount of blendable residue obtainable by other processes, while at the same time said residue product is more readily blendable with blending stocks and also blendable to a substantially smaller quantity of specification residual fuel oil than the residue obtainable by the other processes.

Having discussed various factors involved in the process of the invention and various features thereof, a more detailed description thereof is given with reference to Fig. V.

In accordance with the essential features of the process, a suitable heavy oil stock, such as a reduced crude or straight run residue (SRR), is suitably preheated (not shown), as by heat exchange against hot product streams in the process, and then delivered as by line 11 and pump 12 to a suitable heater, 14, such as a coil or tube heater, wherein it is heated as a single stream or as a plurality of streams to a suitable temperature effective for producing a minor amount of thermal conversion of heavier oil components of the reduced crude, for example about 370° to 425° C., preferably about 375 to 400° C., under any suitable pressure, with a pressure of about atmospheric to about 75 p. s. i. g. being particularly suitable, and at a residence time of about 1 to 3 minutes. At the same time a heavy gas oil produced in the process, as described later, is heated in a suitable furnace 15 (or in a suitable separate coil in furnace 14) at from about 450° to about 550° C. under any suitable pressure, which is advantageously higher than the pressure on the reduced crude in heater 14, for instance from 50 to 200 p. s. i. g., at a residence time selected to result in substantial thermal conversion of the heavy oil components to light gas oil components. The heated reduced crude in line 16 and the heated heavy gas oil in line 17 are then intimately admixed just prior to entering the fractionator 19 or substantially immediately thereafter, as indicated. The two streams are admixed in the ratios of from about 0.3 to about 2.7, heavy gas oil to reduced crude, a particularly suitable ratio being about 1.5. The admixture is separated with a small amount of fractionation in the fractionator 19, of any suitable well-known construction, provided with a suitable dephlegmator 20, if desired. The fractionation in fractionator 19 is effected so that the overhead product removed in line 21 has a dew point of about 375° or lower, with the remainder of the admixture being withdrawn from the bottom of the fractionator at a temperature of the order of about 390° to 415° C.

The residual product withdrawn in line 22 is delivered by means of a pump 24 to a suitable heater 25, wherein additional heat is supplied thereto to provide adequate heat for vaporization of heavy distillable components thereof. If desired, a portion or all of the residual product can be caused to by-pass the heater 25, by means of by-pass line 26, although it is generally preferable to heat the residual product so that the vacuum requirements in the subsequent separation will not be so critical or demanding in order to obtain the desired recovery of distillable components from the final residue product. In general, the residual product is heated to a temperature of about 390° to about 445° C. at a residence time of about 1 to 2 minutes, or less.

The residual product from fractionator 19 is then delivered by line 27 to a suitable separator 29, suitably a vacuum flashing separator provided with elements to effect some reflux and fractionation. The reflux is suitably provided by a dephlegmator 30 in the overhead line. Heavy gas oil is suitably collected as condensate on a trap-out tray 31. Distillate material having a dew point of about 375° to 400° C., at atmospheric pressure, is suitably withdrawn as overhead in line 32, compressed in compressor 34 and admixed with the overhead stream in line 21 from the fractionator 19. The vacuum flashing separator is preferably operated at a pressure of from about 20 to about 100 mm. of Hg pressure to effect the rather complete removal of distillable components from the residue components, which residue is withdrawn by line 35 and pump 36.

The combined overhead product from the first and second stage separations can be utilized directly as feed stock for catalytic cracking operations, as indicated by line 37, or it is suitably fractionated in a fractionating column 39, into a gas fraction (light hydrocarbons) removed in line 40, a thermal gasoline fraction removed in line 41, and a gas oil product removed in line 42. It will be understood that the total product above gasoline (dew point about 200° C.) can be utilized as feed stock for catalytic cracking operations, or it can be fractionated into two or more fractions and the fractions utilized as desired.

The heavy gas oil condensate which collects on tray 31 is withdrawn by line 44 and compressed and pumped by means of compressor 45 to the heater 15, wherein it is thermally treated as already described. If desired, the heavy gas oil recovered from the vacuum flasher 29 can be augmented or replaced in part by heavy gas oil from some other source, such as a heavy catalytically cracked gas oil, as indicated by line 46.

The residue produced in the process, withdrawn from the bottom of the vacuum flasher, is suitably blended with the usual residual oil blending or cutter stock, preferably while the residue is still at an elevated temperature.

As illustrative of a preferred embodiment of the practice of the invention, a mixed Los Angeles Basin reduced crude, as described in connection with Fig. I, was heated as a stream to a temperature of about 400° C. at atmospheric pressure and with a residence time of about three minutes. Simultaneously therewith a heavy gas oil stream (produced in the process as described later) was heated to a temperature of about 520° C. under a pressure of about 60 pounds per square inch gauge, with a residence time of about two minutes. The two streams were intimately admixed in the ratio of 1.3 to 1.0, of heavy gas oil to reduced crude, and the admixture fractionated under reflux conditions to separate an overhead product having a dew point of about 350° C., in a yield of about 65%, based on the reduced crude. The residual product stream therefrom was subsequently vacuum flashed, with fractionation, at a pressure of about 20 mm. of Hg pressure, the stream being heated to a temperature of about 440° C., and about 25% (basis reduced crude) of light gas oil having a dew point of about 400° C. (basis atmospheric pressure) was recovered as an overhead product, about 130% of heavy gas oil (basis reduced crude) having a dew point above about 650° C. was recovered as heavy gas oil distillate, and about 10% of a residue product was recovered which had a precipitation index of about 53, and was blendable with a fairly aromatic cutter stock to about 25% residual fuel oil of good quality and having a viscosity of 150 SSF at 122° F. The heavy gas oil distillate was recycled in the process for further conversion and utility in connection with the first stage of the operation.

We claim as our invention:

1. The method of thermally treating and separating heavy hydrocarbon oils to produce and recover therefrom oil distillate having improved catalytic cracking characteristics and a residue product in reduced amount which is readily blendable to fuel oil, which method comprises: (1) subjecting the heavy oil to a mild thermal treatment at a temperature of about 370° to 425° C. under conditions of pressure and residence time to effect only a minor thermal conversion of components thereof, (2) simultaneously subjecting a heavy gas oil condensate produced in the process as described hereinafter to a more severe thermal treatment above about 450° C., in the substantial absence of readily cokable substances, to effectively convert heavy oil components thereof to light gas oil components, (3) intimately admixing the two thus-heated oil streams in the weight ratio of from about 0.3 to about 2.7, heavy gas oil to heavy oil, and separating therefrom under reflux conditions an overhead stream containing substantially only light gas oil and lighter components and a heavy residual bottoms product stream, (4) separately subjecting the heavy residual product stream to a separation operation under substantially subatmospheric pressure below about 200 mm. Hg to recover therefrom essentially all of the distillable heavy gas oil components thereof and a residue product in a minor amount and which is readily blendable to a residual fuel oil; and (5) recycling the recovered heavy gas oil for thermal treatment in accordance with step 2 and subsequent utility thereof as described hereinbefore.

2. The method of thermally treating and separating a reduced crude oil to produce and recover therefrom oil distillate having improved catalytic cracking characteristics and a residue product in reduced amount which is readily blendable to fuel oil, which method comprises: (1) subjecting the reduced crude to a mild thermal treatment at a temperature of about 375° to 400° C. under substantially atmospheric pressure and at a residence time of about 1 to 3 minutes to effect only a minor thermal conversion of components thereof, (2) simultaneously subjecting a heavy gas oil condensate produced in the process as described hereinafter to a more severe thermal treatment above about 450° C., in the substantial absence of readily cokable substances, to effectively convert heavy oil components thereof to light gas oil components, (3) intimately admixing the two thus-heated oil streams in the weight ratio of from about 0.3 to about 2.7, heavy gas oil to reduced crude, and separating therefrom under reflux conditions an overhead stream containing substantially only light gas oil and lighter components and having a dew point of about 375° C. at atmospheric pressure and the remainder as a heavy residual bottoms product stream, (4) further heating the separated residual bottoms product stream under non-cracking conditions and subjecting it to a separation operation under substantially subatmospheric pressure of about 20 mm. to about 100 mm. of Hg pressure to recover therefrom essentially all of the distillable heavy gas oil components thereof and a residue product in an amount of about 10% of the reduced crude oil and which is readily blendable to a residual fuel oil, and (5) recycling the recovered heavy gas oil for thermal treatment in accordance with step 2 and subsequent utility thereof as described hereinbefore.

3. The method of thermally treating and separating a reduced crude oil containing not over about 60% by weight of distillable components having a molecular weight up to about 500, the remainder being higher molecular weight distillable components and at least about 20% residue components, to produce and recover therefrom oil distillate having improved catalytic cracking characteristics and a residue product in reduced amount which is readily blendable to fuel oil, which method comprises: (1) subjecting the reduced crude to a mild thermal treatment at a temperature of about 375° to 400° C. and at a residence time of about 1 to 3 minutes to effect only a minor thermal conversion of components thereof, (2) simultaneously subjecting a heavy gas oil condensate produced in the process, as described hereinafter, to a more severe thermal treatment above about 450° C., in the substantial absence of cokable substances, to effectively convert heavy oil components thereof to light gas oil components having molecular weights no higher than about 400, (3) intimately admixing the two thus-heated oil streams in the weight ratio of from about 0.3 to about 2.7, heavy gas oil to reduced crude, and separating therefrom under reflux conditions an overhead stream containing substantially only light gas oil and lighter components and having a dew point no higher than about 375° C. at atmospheric pressure and the remainder as a heavy residual bottoms product stream, (4) separately subjecting the heavy residual product stream to a separation operation under substantially subatmospheric pressure below about 100 mm. of Hg pressure to recover therefrom essentially all of the distillable components thereof and separating light gas oil components thereof having a dew point no higher than about 375° C. at atmospheric pressure from heavy gas oil components representing the remainder of the separated distillable components, and (5) recycling the recovered heavy gas oil for thermal treatment in accordance with step 2 and subsequent utility thereof as described hereinbefore.

4. The method of thermally treating and separating a reduced crude oil containing not over about 60% by weight of distillable components having a molecular weight up to about 500, the remainder being higher molecular weight distillable components and residue components, to produce and recover therefrom oil distillate having improved catalytic cracking characteristics and a residue product in reduced amount which is readily blendable to fuel oil, which method comprises: (1) subjecting the reduced crude to a mild thermal treatment at a temperature of about 375° to 400° C. under substantially atmospheric pressure and at a residence time of about 1 to 3 minutes to effect only a minor thermal conversion of components thereof, (2) simultaneously subjecting a heavy gas oil condensate produced in the process, as described hereinafter, to a more severe thermal treatment at a temperature of from about 450° to about 550° C., in the substantial absence of readily cokable substances, to effectively convert heavy oil components thereof to light gas oil components, (3) intimately admixing the two thus-heated oil streams in the weight ratio of from about 0.3 to about 2.7, heavy gas oil to reduced crude, and separating therefrom under reflux conditions an overhead stream containing substantially only light gas oil and lighter components and having a dew point of about 375° C. at atmospheric pressure and the remainder as a heavy residual bottom product stream, (4) further heating the separated residual bottoms product stream under essentially non-cracking conditions and subjecting it to a separation operation under substantially sub-atmospheric pressure of from about 20 mm. to about 100 mm. of Hg pressure to recover therefrom essentially all of the distillate heavy gas oil components thereof and a residue product in an amount of about 10% of the reduced crude oil and which is readily blendable to a residual fuel oil, and (5) recycling the recovered heavy gas oil for thermal treatment in accordance with step 2 and subsequent utility thereof as described hereinbefore.

5. The method of thermally treating and separating a reduced crude oil to produce and recover therefrom oil distillate having improved catalytic cracking characteristics and a residue product in reduced amount which is readily blendable to fuel oil, which method comprises: (1) subjecting the reduced crude to a mild thermal treatment at a temperature of about 375° to 400° C. under conditions of pressure and residence time to effect only a minor thermal conversion of components thereof, (2) simultaneously subjecting a heavy gas oil condensate produced in the process as described hereinafter to a more severe thermal treatment at a temperature of from about 450° to about 550° C., in the substantial absence of readily cokable substances, to effectively convert heavy oil components thereof to light gas oil components, (3) intimately admixing the two thus-heated oil streams in the weight ratio of from about 0.3 to about 2.7, heavy gas oil to reduced crude, and separating therefrom under reflux conditions an overhead stream containing substantially only light gas oil and lighter components and having a dew point of about 375° C. at atmospheric pressure and the remainder as a heavy residual bottoms product stream, (4) separately subjecting the heavy residual product stream to a separation operation under substantially subatmospheric pressure below about 100 mm. Hg pressure to recover therefrom essentially all of the distillable heavy gas oil components thereof and a residue product in a minor amount and which is readily blendable to a residual fuel oil, and (5) recycling the recovered heavy gas oil for thermal treatment in accordance with step 2 and subsequent utility thereof as described hereinbefore.

6. The method of thermally treating and separating a reduced crude oil containing not over about 60% by weight of distillable components having a molecular weight up to about 500, the remainder being higher molecular weight distillable components and at least about 20% residue components, to produce and recover therefrom oil distillate having improved catalytic cracking characteristics and a residue product in reduced amount which is readily blendable to fuel oil, which method comprises: (1) subjecting the reduced crude to a mild thermal treatment at a temperature of about 275° to 400° C. and a residence time of about 1 to 3 minutes to effect only a minor thermal conversion of components thereof, (2) simultaneously subjecting a heavy gas oil condensate produced in the process, as described hereinafter, to a more severe thermal treatment at a temperature of from about 450° to about 550° C. and a residence time of about 1 to 3 minutes, the substantial absence of readily cokable substances, to effectively convert heavy oil components thereof to light gas oil components, (3) intimately admixing the two thus-heated oil streams in the weight ratio of from about 0.3 to about 2.7, heavy gas oil to reduced crude, and separating therefrom under reflux conditions an overhead stream containing substantially only light gas oil and lighter components, and the remainder as a heavy residual bottoms product stream, (4) separately subjecting the heavy residual product stream to a separation operation under substantially subatmospheric pressure below about 100 mm. of Hg pressure to recover therefrom essentially all of the distillable components thereof and separating light gas oil components thereof from the remaining distillable components in a heavy gas oil condensate having a dew point above about 650°, and (5) recycling the recovered heavy gas oil for thermal treatment in accordance with step 2 and subsequent utility thereof as described hereinbefore.

7. The method in accordance with claim 6, wherein the heavy gas oil is thermally treated in step 2 thereof to a temperature of about 520° C., and the ratio in which the two thus-heated oil streams are admixed in step 3 is from about 1.3 to about 1.5.

WARREN C. SIMPSON.
WILLIAM B. WILSON.

References Cited in the file of this patent

UNITED STATES PATENTS

| Number | Name | Date |
|---|---|---|
| 2,069,847 | Pew | Feb. 9, 1937 |
| 2,166,933 | Sullivan | July 15, 1939 |
| 2,326,628 | Egloff | Aug. 10, 1943 |
| 2,332,794 | Hill | Oct. 26, 1943 |